United States Patent
Seymour et al.

(10) Patent No.: US 9,287,802 B2
(45) Date of Patent: Mar. 15, 2016

(54) PASSIVE UNIPOLAR REFERENCING FOR NON-ISOLATED INVERTERS

(71) Applicants: Eric Seymour, Fort Collins, CO (US); Dustin Kramer, Fort Collins, CO (US)

(72) Inventors: Eric Seymour, Fort Collins, CO (US); Dustin Kramer, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 695 days.

(21) Appl. No.: 13/681,010

(22) Filed: Nov. 19, 2012

(65) Prior Publication Data
US 2014/0139031 A1    May 22, 2014

(51) Int. Cl.
*H02M 7/44*    (2006.01)
*H02M 7/48*    (2007.01)
*H02J 3/38*    (2006.01)

(52) U.S. Cl.
CPC ............... *H02M 7/48* (2013.01); *H02J 3/383* (2013.01); *Y02E 10/563* (2013.01); *Y10T 307/707* (2015.04)

(58) Field of Classification Search
CPC ......... H01T 19/04; H01T 23/00; H02M 7/48; H02J 3/383; Y10T 307/707; Y02E 10/563
See application file for complete search history.

(56) References Cited

U.S. PATENT DOCUMENTS

| | | | | |
|---|---|---|---|---|
| 8,643,986 | B2 * | 2/2014 | West | 361/42 |
| 2009/0190275 | A1 * | 7/2009 | Gilmore et al. | 361/42 |
| 2012/0026631 | A1 * | 2/2012 | Kazemi et al. | 361/42 |
| 2012/0250193 | A1 * | 10/2012 | Kevelos et al. | 361/45 |

FOREIGN PATENT DOCUMENTS

DE    WO2010/078669    *    7/2010    ............. H02J 3/383

* cited by examiner

*Primary Examiner* — Zeev V Kitov
(74) *Attorney, Agent, or Firm* — Neugeboren O'Dowd PC (57) ABSTRACT

Systems and methods for referencing a photovoltaic array are disclosed. An exemplary method includes converting DC power with an inverter from a photovoltaic array to AC power at a line frequency and placing the entire photovoltaic array above ground potential or below ground potential. The AC power is transformed with a transformer and an integrity-check signal is generated to vary a voltage of the photovoltaic array to perform an integrity check. A star point of the transformer is pinned to ground at the line frequency so the integrity-check signal is applied to the DC-side of the inverter and a limited level of fault current is allowed to flow from ground to the star point of the transformer to facilitate a detection of ground faults.

8 Claims, 6 Drawing Sheets

PASSIVE UNIPOLAR REFERENCING FOR NON-ISOLATED INVERTERS

BACKGROUND

1. Field

The present invention relates generally to photovoltaic energy conversion systems, and more specifically to unipolar, non-isolated photovoltaic energy conversion systems.

2. Background

Figure 1:
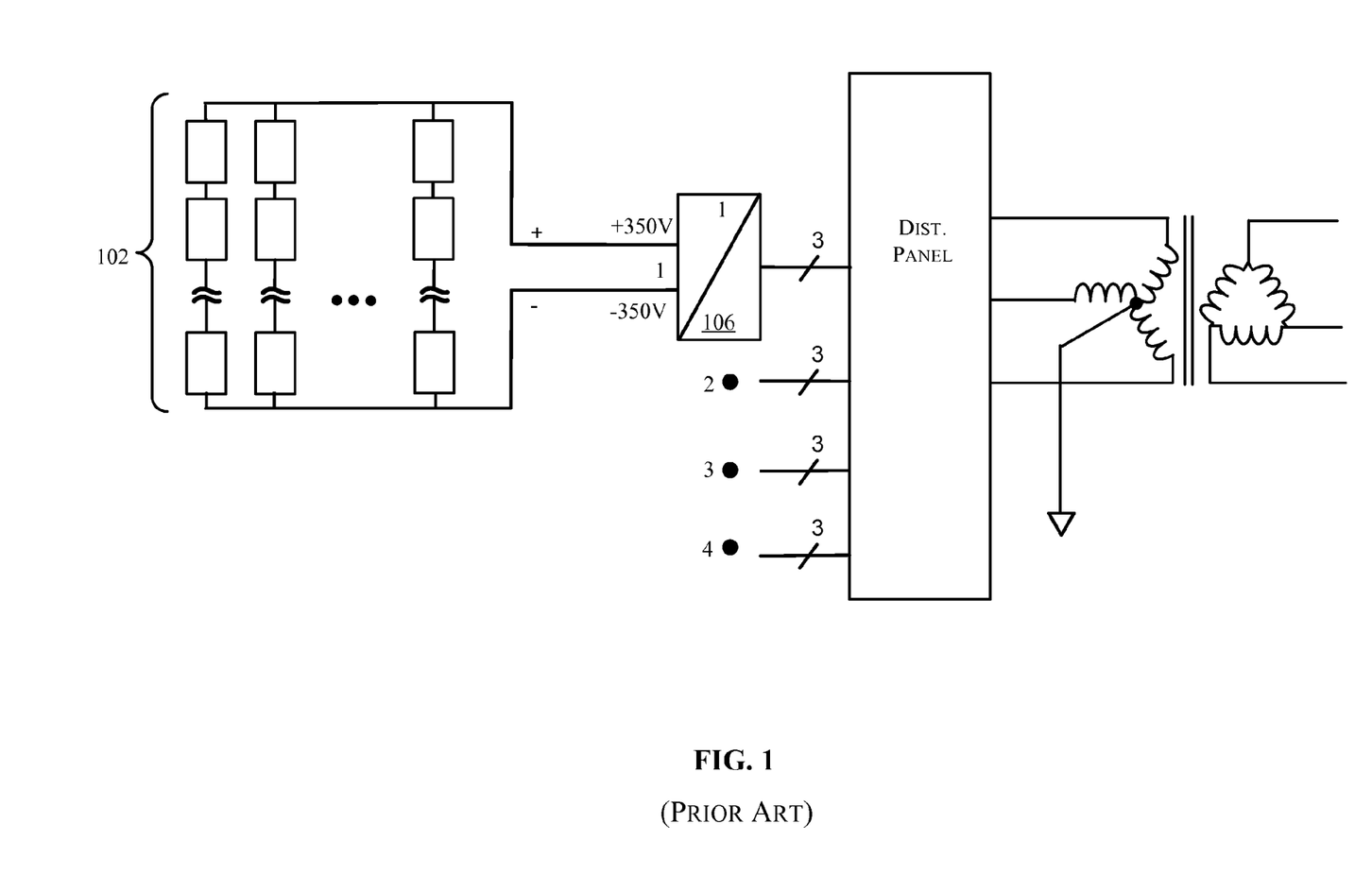
FIG. 1 is a diagram depicting a typical non-isolated, bipolar photovoltaic energy conversion system.

Referring to FIG. 1, shown is a typical prior art photovoltaic (PV) system that depicts four inverters coupled between a distribution panel and four corresponding portions of a photovoltaic array. For simplicity, one array portion 102 and one corresponding inverter 106 are shown and three other array-inverter combinations are represented but not shown in detail. As shown, each photovoltaic array includes a plurality of strings that may be stacked up to one of a variety voltages (e.g., 1000 VDC).

As shown, each of the four inverters connects to the distribution panel that is coupled to a wye-delta transformer that may reside on the same skid as the inverters. In this conventional approach, the center star point reference on the primary side of the wye-delta transformer becomes the singular electrical system ground reference for all four inverters. In other words, each of the inverters derives its reference from the AC phases themselves, which are low impedance and symmetrically referenced around ground. The low impedance and symmetry are translated through each of the inverters so that a plus-minus even voltage split occurs around ground potential at the inputs to each inverter. For exemplary purposes, in this depicted system, the differential voltage across each inverter is 700 Volts so that an even split of around +350 and −350 Volts is at the inputs to the inverters.

Operating inverters in a bipolar (e.g., one input of the inverter 106 sits above ground and the other input sits below ground potential) approach has several advantages, but many photovoltaic modules have a polarity restriction that prevents integrators from utilizing a bipolar architecture. In particular, some thin film panels undergo a destructive degradory process when operated below ground potential. As a consequence, many panel manufacturers will not warranty their panels for use in bipolar architectures; thus it is known that this type system depicted in FIG. 1 needs to be modified so that the arrays operate entirely above ground potential (or entirely below ground potential for some photovoltaic panel types).

The depicted system in FIG. 1 is also a non-isolated system in the sense that the AC side of each inverter is not isolated from other inverters by a corresponding transformer. The depicted transformerless system is beneficial from the perspective that expensive and heavy isolation transformers installed for each inverter are avoided. But in the depicted transformerless system, it is not possible to convert the system to a unipolar mode of operation by simply placing a ground connection on the negative rail input of each inverter (or a ground connection to the positive rail), which can be done in systems that utilize transformer isolation techniques. It should be recognized that the wye-delta transformer depicted in FIG. 1 operates to convert the relatively low AC voltage at the outputs of the inverters to a high AC voltage for distribution—it does not function to isolate the inverters from each other.

As a consequence, to retain the benefits of multiple (in this example four) non-isolated inverters (e.g., which do not have four individual transformers or a transformer with four separate sets of secondary windings) an alternative approach to grounding one of the inverter input rails is required to operate the photovoltaic panels in a unipolar configuration.

Figure 2:
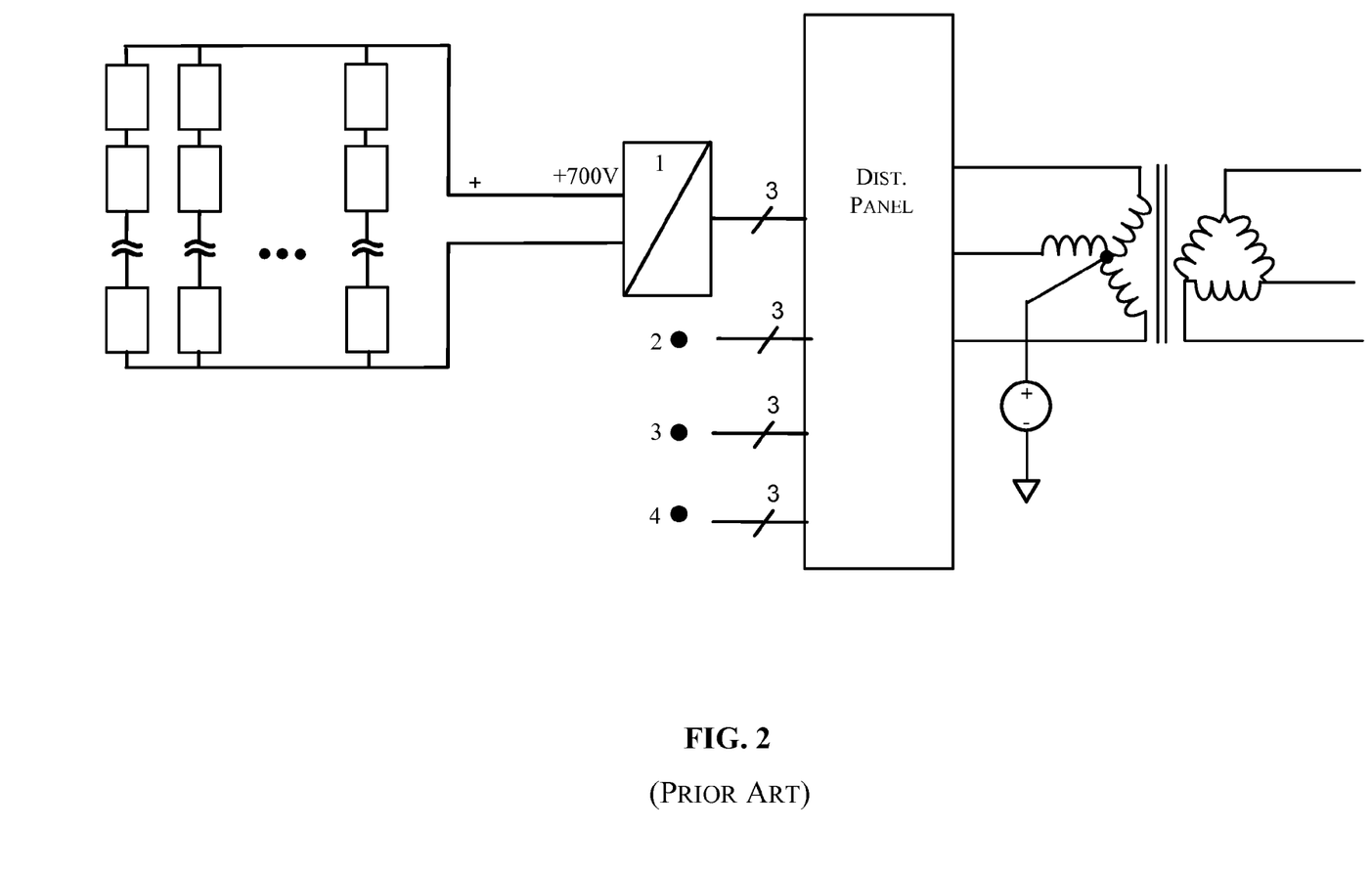
FIG. 2 is a diagram depicting a typical non-isolated, unipolar photovoltaic energy conversion system.

As shown in FIG. 2, one way to place the array above ground potential (or below ground potential) is to place a power supply on the star point of the distribution transformer to elevate the secondary voltage with respect to ground by a DC common-mode voltage. For example, if the star point is elevated by 500 Volts above ground potential, the array would operate above ground potential when the inverters are processing power. This approach, however, requires a power source, which is costly and requires energy to provide continuing power. As a consequence, there is a need in the art for alternative approaches to converting the system depicted in FIG. 1 to a unipolar mode of operation.

SUMMARY

Aspects of the present invention include a system for referencing a photovoltaic array that includes an inverter to convert DC power from the photovoltaic array to AC power and apply the AC power to a transformer at a line frequency. An impedance offset component is coupled to a DC input of the inverter to place the entire photovoltaic array above ground potential or below ground potential and a referencing component is coupled between a star point of the transformer and ground. The referencing component raises the potential of the star point with respect to ground, allows a flow of ground fault currents from a fault to the star point, and ties the star point to ground at the line frequency.

The system may include a signal generator to generate a signal at a higher frequency than the line frequency and apply the signal to the photovoltaic array to increase a difference between voltages on portions of the photovoltaic array and ground. In addition, the system may include a reference component connection detector that is coupled to DC inputs of the inverter to detect the signal to confirm the referencing component is coupled between the star point and ground.

Other aspects of the present invention include a method for referencing a plurality of non-isolated photovoltaic inverters. The method may include coupling each of the inverters between a corresponding one of a plurality of portions of a photovoltaic array to a transformer and coupling each of a plurality of impedance offset components between ground and a corresponding one of a plurality of DC input rails of each of the inverters. A referencing component is coupled between a star point of the wye-connected transformer and ground that allows an application of a DC voltage that raises a potential of the star point with respect to ground, and ties the star point to ground at a line frequency that is output by the inverters.

Yet another aspect may be characterized as a method for referencing a photovoltaic array that includes converting DC power with an inverter from a photovoltaic array to AC power at a line frequency and placing the entire photovoltaic array above ground potential or below ground potential. An integrity-check signal is generated to vary a voltage of the photovoltaic array to perform an integrity check, and a star point of the transformer is pinned to ground at the line frequency so the integrity-check signal is applied to the DC-side of the inverter. And in addition, a limited level of fault current is permitted to flow from ground to the star point of the transformer to facilitate a detection of ground faults.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 3:
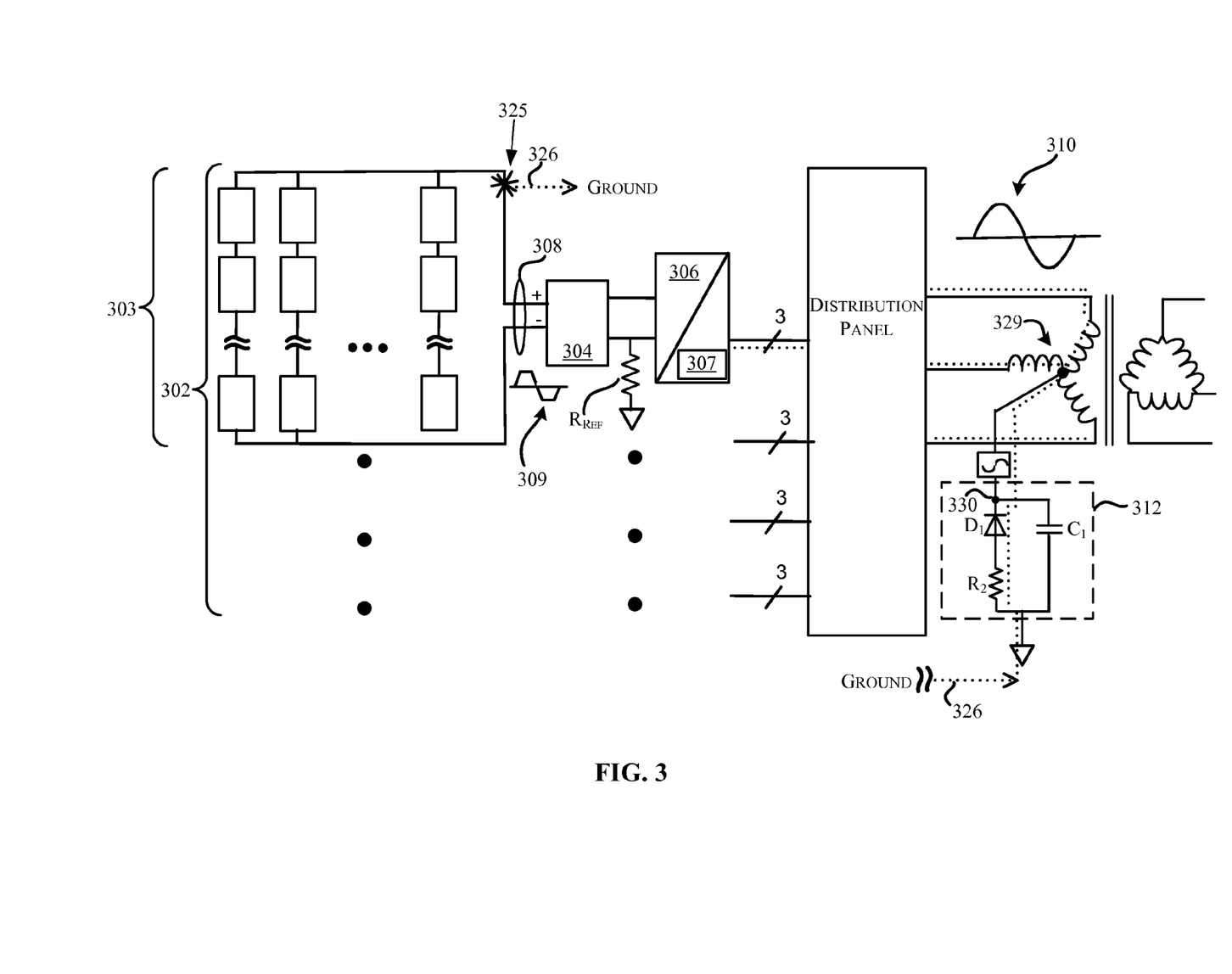
FIG. 3 is a diagram depicting aspects of an inventive unipolar photovoltaic energy conversion system.

Referring to FIG. 3, shown is a photovoltaic energy conversion system depicting inventive aspects described herein. In general, the system depicted in FIG. 3 provides the benefits of a transformerless implementation (e.g., without isolation transformers to galvanically isolate multiple inverters) while providing the unipolar referencing required by many photovoltaic panel manufactures. Additionally, although not required, the photovoltaic energy conversion system enables the implementation of enhanced diagnostics within a ground fault interruption system.

As shown, on the DC-side of each inverter 306, coupled between a portion 303 of an array 302 and each inverter 306, are a ground fault detector and interrupter 304 and an offset resistor $R_{REF}$. And in addition, the star point of the wye-connected distribution transformer is AC referenced to ground via referencing component 312 (also referred to as an offset reference neutral clamp). Also depicted are a ground fault 325 on a positive rail of the portion of the array 302 and a corresponding ground fault current 326 that propagates through the referencing component 312.

The ground fault detector and interrupter 304, the offset resistor $R_{REF}$, and the referencing component 312 are depicted as separate elements merely for purposes of description, but when implemented, the offset resistor $R_{REF}$, ground fault detector and interrupter 304, and referencing component 312 may be implemented within the same housing as the inverter 306. It should also be recognized that four array-inverter chains are depicted, but for purposes of clarity, only one portion 303 of the array 302, one ground fault detector and interrupter 304, one offset resistor $R_{REF}$, and one inverter 306 are depicted in detail. And the portion 303 of the array 302 is itself a photovoltaic array, which may be replicated to form the array 302; thus references herein to an array apply to the portion 303 of the array 302. It should also be recognized that any arbitrary number of N parallel array-inverter chains maybe implemented. In addition, it should be recognized that the depicted wye-connected transformer need not be a wye-delta transformer—it may also be a wye-wye or a delta-wye transformer used in concert with a zig-zag referencing transformer.

Although not required to be implemented in connection with the unipolar referencing techniques described herein, the ground fault detector and interrupter 304 generally operates to detect unsafe ground fault conditions (e.g., the ground fault 325) and acts rapidly to cease the unsafe flow of DC current (e.g., ground fault current 326) from the array 302 to ground. In many embodiments for example, the ground fault detector and interrupter 304 uses current-based detection techniques to sense a ground fault and isolate the corresponding portion 303 of array 302 from ground and the inverter 306. And the ground fault detector and interrupter 304 may also utilize an economically beneficial approach of testing whether the referencing component 312 is properly coupled between the star point of the wye-connected transformer and ground. As discussed further herein, the signal generator 307 enables the ground fault detector and interrupter 304 to detect defects (e.g., insulation-integrity failures) that would ordinarily go undetected by applying an integrity-check signal 309 that varies the voltage of the array 302.

As shown in FIG. 3, each of the typically-negative input rails to the inverters in this embodiment are resistively referenced to ground by an impedance element, for example the depicted offset resistor $R_{REF}$, to effectively place what would be a negative rail at ground potential; thus converting a typically bipolar system to a unipolar system. The unipolar referencing to place the array 302 above or below ground potential is performed by the offset resistors $R_{REF}$ in aggregate. As a consequence, the multiple non-isolated inverters depicted in FIG. 3 may be utilized with polarity-restricted photovoltaic panels. In the particular variation depicted in FIG. 3, the impedance elements are coupled to negative rails of the inverters to place the arrays above ground potential for photovoltaic panels that are restricted to operation above ground potential. In another variation of the embodiment depicted in FIG. 3, the impedance elements (e.g., offset resistors $R_{REF}$) are coupled to the positive rails of the inverters to place the arrays below ground potential for photovoltaic panels that are restricted to operation below ground potential. In this alternative variation, the diode D1 is flipped for proper operation.

In addition, the star point 329 of the wye-connected distribution transformer is coupled to ground via a fuse in series with the referencing component 312 (also referred to as an offset reference neutral clamp). As shown in this exemplary embodiment, a capacitor C1 and cathode of a diode D1 of the referencing component 312 are coupled to the potential of the star point 329 at node 330. And the anode of diode D1 is coupled to ground via resistor R2; thus the series combination of diode D1 and resistor R2 is in parallel to C1 between node 330 and ground.

The referencing component 312 in this embodiment effectuates several functions to enable the offset referencing of multiple non-isolated inverters (e.g., so polarity-restricted PV panels may be utilized) while simultaneously accommodating beneficial fault-detection aspects of the depicted system. For example, the exemplary referencing component 312 "pins" the star point 329 of the wye-connected transformer to ground at frequencies at the line frequency 310 (e.g., 60 Hz or 50 Hz) or higher so that the integrity-check signal 309 generated by the signal generator 307 changes the voltage on the DC-side of the inverter (to check for imperfections in the portion 303 of the array 302 and its interconnections) instead of changing the voltages on the secondary side of the wye-connected transformer.

More specifically, the signal generator 307 applies the integrity-check signal 309 to the portion 303 of the array 302 to vary voltages in different portions (e.g., all portions) of the portion 303 of the array 302 so that no spot in the portion 303 of the array 302 is close to ground potential all the time. If there were a spot in the array 302 that was close to ground potential for substantial periods of time, then there could potentially be a ground fault in the array 302 at or near this location, which would render the fault unobservable because it would draw little, or no, fault current through detector 304 nor would it re-reference the array's position with respect to ground. Thus, the signal generator 307 of each of the inverters 306 diminishes (or removes) any neutral blind spot problems and enables a continuous insulation integrity check to be performed on all areas of the array 302.

The signal generator 307, which could be manifested by the inverter switching behavior itself, may generate the integrity-check signal 309 as a 180 Hz AC perturbation (or a 150 Hz perturbation in 50 Hz systems) as well as other frequencies to "wiggle" the potential of the array 302 with respect to ground. In other embodiments the signal generator 307 may be realized by a dedicated signal generation component (that is independent from the inverter operation), which injects a signal to wiggle the potential of the array 302 with respect to ground.

In the exemplary referencing component 312, the capacitor C1 may have a capacitance (e.g., a few hundred microfarads) so that, at the line frequency (e.g., 60 Hz or 50 Hz), there is very little impedance to ground; thus the capacitor C1 ties the star point 329 to ground at the line frequency 310 so that the integrity-check signal 309 generated by the signal generator 307 affects the voltage of the DC side of the inverters (e.g., the portion 303 of the array 302) instead of the AC side. If the star point 329 were not pinned to ground by the referencing component 312, the signal generator 307 would have less effect upon the voltage of the portion 303 of the array 302 and any insulation failures in the portion 303 of the array 302 at or near ground potential may go undetected by the ground fault detector and interrupter 304.

Another function of the referencing component 312 is to enable common-mode fault currents (e.g., the fault current 326) to flow through the referencing component 312 for a sufficient period of time to enable the fault detection component 304 to detect the fault currents. In the exemplary referencing component 312, the diode D1 enables fault currents that may occur to flow though the referencing component 312 back through the star point 329 so that the current-based fault detection component 304 has enough time to detect the fault 325. In addition, the diode D1 allows the system to offset itself by the offset voltage that is produced by offset resistors $R_{REF}$. In some implementations, the offset voltage that is produced across the diode D1 and capacitor C1 is one half of what the average overall DC voltage is among the four inverters. So if there is 800 VDC across each of the four inverters, there will be approximately 400 Volts at node 330. Although not required, in some embodiments the offset resistors $R_{REF}$ may each be about 2.5 k Ohms.

Yet another aspect of the exemplary referencing component 312 is a fault-current-limiting feature to prevent the fault currents from reaching damaging levels. In the depicted embodiment, the resistor R2 functions as a fault-current-limiting device so that if there is a low impedance ground fault in the AC phases or in one or more of the rails on the DC side of the inverters (especially the positive rail), the resistor R2 provides an additional protection benefit. Resistor R2 may be realized by a relatively low resistance to enable fault currents (e.g., the fault current 326) to flow through the resistor R2 and diode D1, but high enough (e.g., 10 Ohms) to prevent fault currents from reaching dangerously high levels. If there is a ground fault on the positive DC rail in a bi-polar configuration of a conventional system with a low-impedance ground connection from the star point (e.g., as depicted in FIG. 1), that fault current can be thousands of amps even though fuses in the system will clear quickly; thus there is likely to be inverter engine damage. With resistor R2 in place, the fault current is limited to a few hundred amps and the potential damage to the engines of the inverters is reduced or eliminated.

Thus, the embodiment depicted in FIG. 3 has the same benefits for multiple non-isolated inverters as compared to the system described with reference to FIG. 2, but the system depicted in FIG. 3 enables fault-detection and unipolar referencing capabilities discussed above with a dramatically reduced parts count, improved reliability, and without the need to bring a source of power to a power supply.

Although it is certainly contemplated, in view of this disclosure, that the referencing component 312 may be realized by one of ordinary skill utilizing alternative components to achieve the same functions described herein, in this exemplary embodiment, the referencing component 312 is a passive component in the sense that it does not include a power supply to offset the voltage potential of the star point 329 from ground. Although switched components, such as transistors, may be utilized within the referencing component 312 in some variations of the embodiment shown in FIG. 3, these variations do not include a power supply to create a common-mode offset voltage between the star point and ground. Additionally, the referencing component 312 in the depicted embodiment does not provide the DC offset with respect to ground as with power-supply-based systems. Instead, the DC offset is provided from the Rref resistors of one or more inverters 306 connected to the wye-connected transformer. Although the DC electrical system reference may be derived from the collective action of one or more Rref resistors, the electrical system reference for frequencies of line frequency and higher is derived from the referencing component 312. Such frequency-dependent reference location behavior is not exhibited with power supply based offset systems such as that depicted in FIG. 2.

Figure 4:
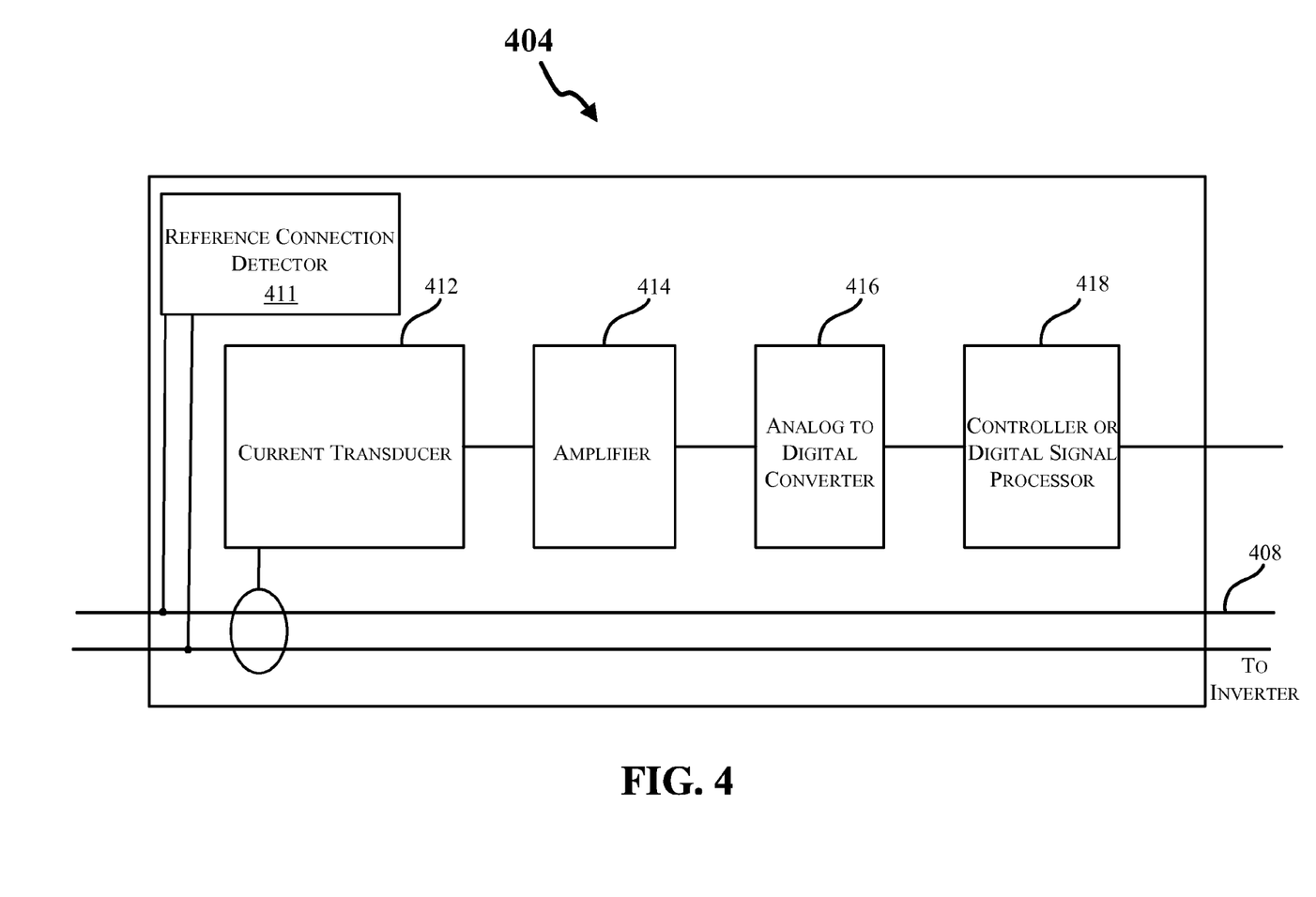
FIG. 4 is block diagram depicting an exemplary fault detection component depicted in FIG. 3.

Referring briefly to FIG. 4, shown is an exemplary ground fault detector and interrupter 404. As shown, in this embodiment a reference connection detector 411 detects whether the integrity-check signal 309 provided by the signal generator 307 is present at the inputs 408 to the inverter 306 (which is the case when the star point 329 is pinned to ground by the reference component 312), and if not, the reference connection detector 411 may generate an alarm or other indicator to inform an operator that the wye-connected transformer may not be properly coupled to ground via the reference component 312. Also shown in the ground fault detector and interrupter 404 is a processing chain including a current transducer 412, amplifier 414, A/D converter 416, and controller or digital signal processor 418 that is capable of detecting common-mode currents in the input lines 408, which those of skill in the art will understand are used to detect undesirable ground faults (e.g., ground fault 325). Although the reference connection detector 411 is depicted as part of the ground fault detector and interrupter 404 in FIG. 4, this is certainly not required, and in other embodiments, the reference connection detector 411 may be implemented separately from the ground fault detector and interrupter 404.

Figure 5:
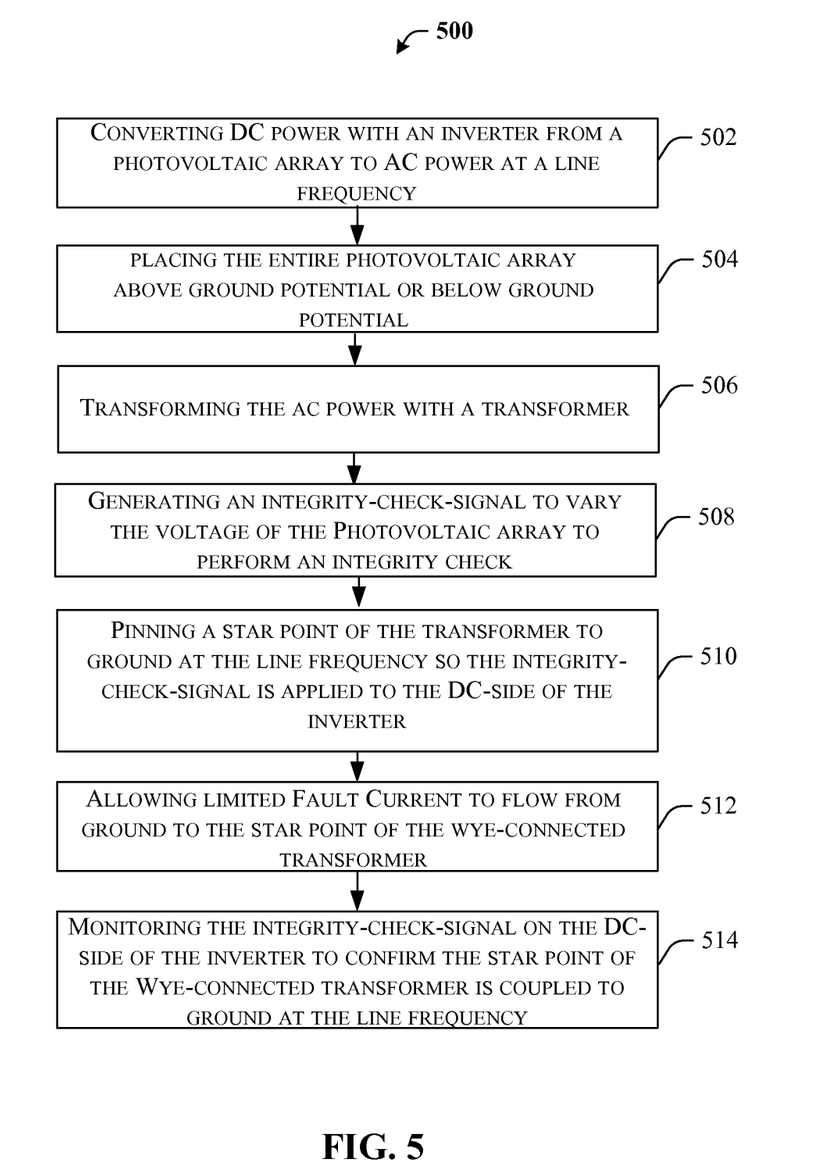
FIG. 5 is a flow chart an exemplary method that may be traversed in connection with embodiments described herein.

Referring next to FIG. 5, it is a flowchart depicting a method that may be traversed in connection with embodiments described herein. As shown, DC power from a photovoltaic array (e.g., array 302) is converted to AC power (e.g., by inverter 306) at a line frequency (e.g., 60 Hz or 50 Hz) (Block 502), and the entire photovoltaic array is placed above or below ground potential (Block 504). As depicted, the AC power is transformed with a transformer (e.g., a wye-connected transformer)(Block 506), and an integrity-check signal (e.g., integrity-check signal 309) is generated to vary the voltage of the photovoltaic array to perform an integrity check (Block 508). As discussed above, the integrity-check signal 309 may be derived from signals inherently generated within an inverter, or may be independently generated by a separate signal generator.

As depicted, a star point of the transformer is pinned to ground at the line frequency so the integrity-check signal 309 is applied to the DC-side of the inverter (Block 510). And in the exemplary method, fault current is allowed to flow from ground to the star point, but the fault current is limited (Block 512). The integrity-check signal may also be monitored on the DC-side of the inverter to confirm the start point of the transformer is coupled to ground at the line frequency (Block 514). As discussed above, when the star point is pinned to ground, the integrity-check signal 309 affects the voltage on the DC side of the inverter more (e.g., the voltage of the corresponding portion of the array varies more) than it would if the star point 329 were not grounded, and this greater affect may be detected to confirm the referencing component (e.g., referencing component 312) is coupled between the star point and ground.

As a consequence, several embodiments described above with reference to FIGS. 3-5 provide cost-effective unipolar array referencing to mitigate or eliminate the destructive and degrading process that may occur when arrays are placed at an undesirable potential. Additionally, some variations of these embodiments enable one or more common-mode diagnostic methodologies to be employed.

Figure 6:
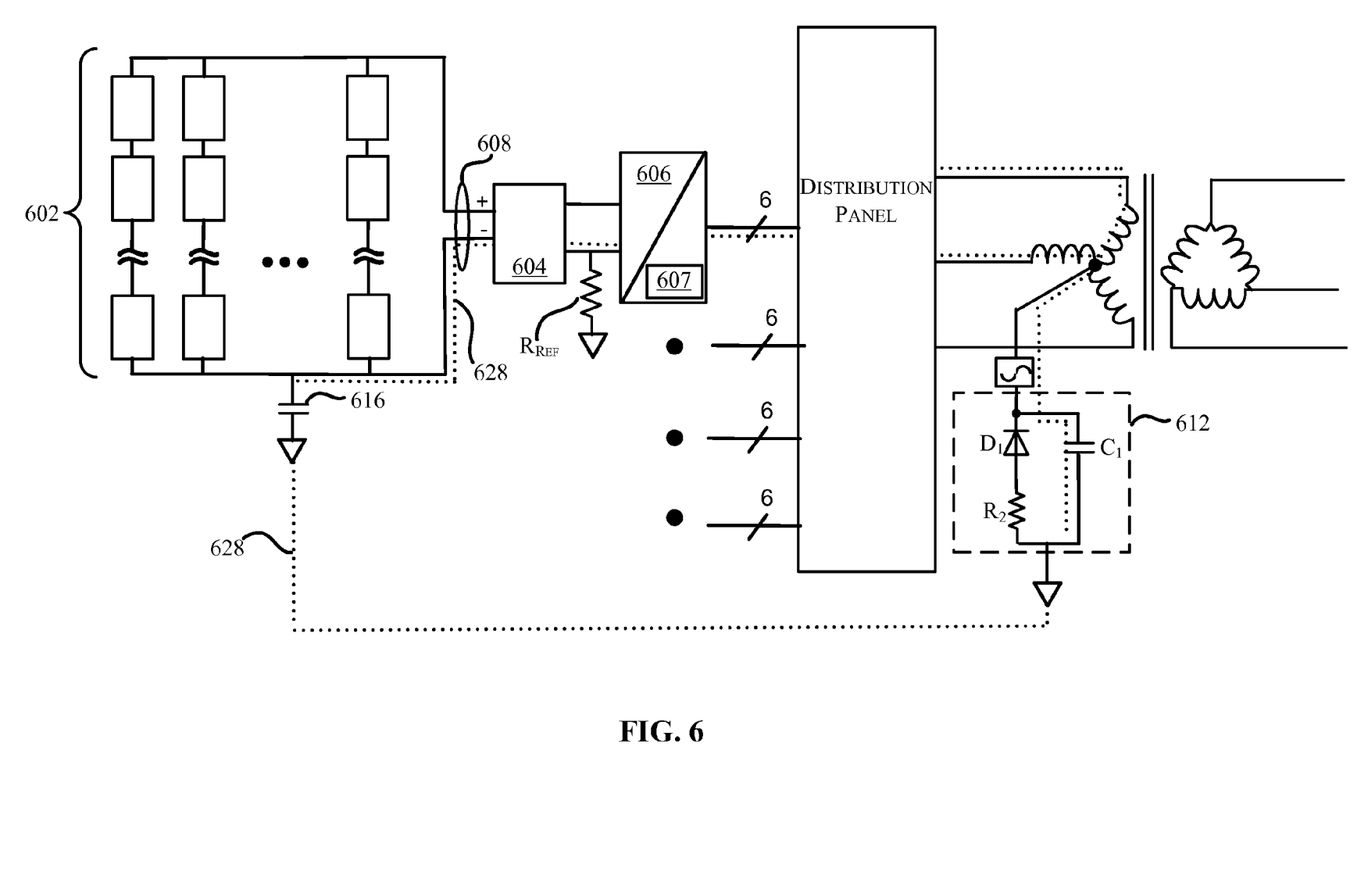
FIG. 6 is a diagram depicting aspects of another inventive unipolar photovoltaic energy conversion system.

Referring next to FIG. 6, shown is an embodiment of a photovoltaic system that is similar to the system depicted in FIG. 3, except that in this system, a signal generator 607 generates a diagnostic signal 628 that is imparted to the wye-connected transformer at a frequency (or frequencies) that enables the diagnostic signal 628 to propagate from the transformer to the array (e.g., array 602) via a common mode path that includes a referencing component 612, ground, and parasitic capacitance 616 between the array 602 and ground. Thus, in this embodiment, the referencing component 612 allows a desired offset between the star point and ground, and enables, in several embodiments, the common mode diagnostic signal 628 to propagate, via the referencing component 612 and ground, to the array 602 to cause variations in voltage across various portions of the array (e.g., all portions of the array) to enable a continuous insulation integrity check. In the embodiment depicted in FIG. 6, the capacitor C1 is sized so that it tolerates the parasitic current of the diagnostic signal 628 while retaining a close reference potential to ground for the electrical system. The low reference impedance for AC signals also satisfies nominal conditions for the reference connection detector 611.

In addition, the input lines of each of the inverters is monitored with a ground fault detector 604 to detect ground faults, and the diagnostic signal 628 that flows from the star point, through the referencing component 612, through ground, to the array (via capacitive coupling with ground) is optionally detected to determine whether the referencing component 612 is coupled between the star point and ground.

The signal generator 607, which could be manifested by the inverter switching behavior itself, may generate the diagnostic common-mode signal 628 as a 180 Hz AC perturbation (or a 150 Hz perturbation in 50 Hz systems) as well as other frequencies inherent to the operation of the inverter 306 in order to "wiggle" the potential of the array 302 with respect to ground. As a result, naturally occurring currents 628 through parasitic array-to-ground capacitance 616 may result from the operation of the common-mode signal generator 607. The signal generator 607 in this embodiment must be capable of, and the impedance of the referencing component 612 low enough, in order to drive the parasitic common-mode signal 628. Additionally, the presence of these parasitic currents may be measured and used diagnostically to assess the proper connection and operation of the referencing component 612. Alternatively, the proper connection and operation of the referencing component 612 may be assessed by the presence of expected AC common-mode content on the DC rails 608. An absence of expected AC common-mode voltage at the DC rails 608 may be used to diagnose improper connection or operation in the referencing component 612. Although the signal generator 607 may reside within the same housing as the inverter and utilize inherent signals generated within the inverter, this is not required, and the signal generator may be realized by a separate, discrete component that may be added to an existing photovoltaic system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied, at least in part, directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for referencing a photovoltaic array including:
an inverter to convert DC power from the photovoltaic array to AC power and apply the AC power to a transformer at a line frequency;
an impedance offset component coupled to a DC input of the inverter to place the entire photovoltaic array above ground potential or below ground potential; and
a referencing component coupled between a star point of the transformer and ground, the referencing component raises the potential of the star point with respect to ground, allows a flow of ground fault currents from a fault to the star point, and ties the star point to ground at the line frequency;
wherein the referencing component includes a parallel combination of a non-linear element and a reactive component, wherein the non-linear element includes a diode that allows the flow of fault currents, and the reactive component includes a capacitor, and wherein the referencing component includes a resistor in series with the diode to limit the flow of the fault currents.

2. The system of claim 1 including a signal generator to generate a signal at a higher frequency than the line frequency and apply the signal to the photovoltaic array to increase a difference between voltages on portions of the photovoltaic array and ground.

3. The system of claim 1, including a reference component connection detector that is coupled to DC inputs of the inverter to detect the signal to confirm the referencing component is coupled between the star point and ground.

4. A method for referencing a plurality of non-isolated photovoltaic inverters, the method comprising:
coupling each of the inverters between a corresponding one of a plurality of portions of a photovoltaic array to a wye-connected transformer;
coupling each of a plurality of impedance offset components between ground and a corresponding one of a plurality of DC input rails of each of the inverters; and
coupling a referencing component between a star point of the wye-connected transformer and ground, the referencing component allowing an application of a DC voltage that raises a potential of the star point with respect to ground, and ties the star point to ground at a line frequency that is output by the inverters;
wherein the referencing component includes a parallel combination of a non-linear element and a reactive component, wherein the non-linear element includes a diode and the reactive component includes a capacitor, and wherein the referencing component includes a resistor in series with the diode.

5. A system for referencing a photovoltaic array including:
a plurality of inverters to convert DC power from corresponding portions of the photovoltaic array to AC power and apply the AC power to a transformer;
a plurality of impedance offset components, each of the impedance offset components coupled to a corresponding one of the inverters to place the entire photovoltaic array above ground potential or below ground potential;
a plurality of ground fault detectors, each of the ground fault detectors coupled to the portions of the photovoltaic array to detect ground faults; and
a referencing component coupled between a star point of the transformer and ground, the referencing component allowing an application of a DC voltage that raises a potential of the star point with respect to ground, and allows fault currents to flow via a current path that includes a fault in the array, ground, the referencing component, and the star point;
wherein the referencing component includes a parallel combination of a non-linear element and a reactive component, wherein the non-linear element includes a diode and the reactive component includes a capacitor, wherein the referencing component includes a resistor in series with the diode.

6. The system of claim 5, including a signal generator to generate a signal and apply the signal to the photovoltaic array to increase a difference between voltages on the portions of the photovoltaic array and ground; and
wherein the referencing component pins the star point to ground at a line frequency of the AC power to enhance the application of the signal to the photovoltaic array.

7. A method for referencing a photovoltaic array comprising:
converting DC power with an inverter from a photovoltaic array to AC power at a line frequency;
placing the entire photovoltaic array above ground potential or below ground potential;
transforming the AC power with a transformer;
generating an integrity-check signal to vary a voltage of the photovoltaic array to perform an integrity check;
pinning a star point of the transformer to ground at the line frequency so the integrity-check signal is applied to the DC-side of the inverter; and
allowing limited fault current to flow from ground to the star point of the transformer to facilitate a detection of ground faults;
wherein at least one of the ground fault detectors detects the signal to confirm the referencing component is coupled between the star point and ground.

8. The method of claim 7, including:
monitoring the integrity-check signal on the DC side of the inverter to confirm the star point of the transformer is coupled to ground at the line frequency.

* * * * *